United States Patent [19]
Yuen

[11] Patent Number: 5,437,039
[45] Date of Patent: Jul. 25, 1995

[54] SERVICING TRANSPARENT SYSTEM INTERRUPTS AND REDUCING INTERRUPT LATENCY

[75] Inventor: Desmond Yuen, San Leandro, Calif.

[73] Assignee: Intel Corporation, Santa Clara, Calif.

[21] Appl. No.: 47,172

[22] Filed: Apr. 13, 1993

Related U.S. Application Data

[63] Continuation of Ser. No. 886,965, May 21, 1992, abandoned.

[51] Int. Cl.⁶ .................................................. G06F 9/46
[52] U.S. Cl. ...................................... 395/725; 395/650
[58] Field of Search ............... 395/725, 700, 650, 275, 395/325; 364/468

[56] References Cited

U.S. PATENT DOCUMENTS

| | | | |
|---|---|---|---|
| 4,096,571 | 6/1978 | Vander Mey | 395/425 |
| 4,177,513 | 12/1979 | Hoffman et al. | 395/650 |
| 4,200,912 | 4/1980 | Harrington et al. | 395/725 |
| 4,734,882 | 3/1988 | Romagosa | 395/725 |
| 5,014,208 | 5/1991 | Wolfson | 364/468 |
| 5,115,392 | 5/1992 | Takamoto et al. | 395/650 |
| 5,175,853 | 12/1992 | Kardach et al. | 395/650 |
| 5,339,437 | 8/1994 | Yuen | 395/700 |

*Primary Examiner*—Jack B. Harvey
*Assistant Examiner*—Glenn A. Auve
*Attorney, Agent, or Firm*—Blakely, Sokoloff, Taylor & Zafman

[57] ABSTRACT

A system management interrupt (SMI) handler comprising a plurality of service tasks is provided a computer system to service SMIs. The service tasks are executed interleavingly with normal execution. A SMI task queue is provided to queue incidences of the service tasks for servicing SMIs. A SMI trigger mechanism comprising a timer is reserved for triggering execution of the service tasks. A register is predesignated to store a SMI status word for differentiating a SMI is triggered by the reserved SMI trigger mechanism from other SMIs triggered by other general purpose SMI trigger mechanism. As a result, the interrupt latency for servicing a SMI is reduced.

15 Claims, 6 Drawing Sheets

SERVICING TRANSPARENT SYSTEM INTERRUPTS AND REDUCING INTERRUPT LATENCY

This is a continuation of application Ser. No. 07/886.965, filed May 21, 1992, now abandoned.

RELATED APPLICATIONS

This application is related to the following applications:

1. U.S. patent application, Ser. No.: 07/594,278, entitled *Transparent System Interrupt*, filed on Oct. 9, 1990.
2. U.S. patent application, Ser. No.: 07/753,605, entitled *Transparent System Interrupts with Extended Memory Addressing*, filed on Aug. 31, 1991.
3. U.S. patent application, Ser. No.: 07/753,327, entitled, *Transparent System Interrupts with Auto Halt Restart*, filed on Aug. 31, 1991.
4. U.S. patent application, Ser. No.: 07/753,107, entitled *Transparent System Interrupts with Automated Input/Output Trap Restart*, filed on Aug. 31, 1991.
5. U.S. patent application, Ser. No.: 07/858,323, entitled *Method and Apparatus For Saving A System Image Onto Permanent Storage That Is Operating System Independent*, filed on Mar. 25, 1992.
6. U.S. patent application, Ser. No.: 07/858,301, entitled *Method and Apparatus For Debugging A Computer System*, filed on Mar. 25, 1992.

BACKGROUND OF THE INVENTION

1. Field of the Invention

The present invention relates to the field of computer systems, in particular, microprocessor based computer systems. More specifically, the present invention is related to servicing and reducing interrupt latency of transparent system interrupts supported by these computer systems.

2. Background

Today, some computer systems offer system interrupts that are transparent to the operating system and application programs executed by the computer systems. For example, the System Management Interrupt (SMI) provided on the "Intel386 TM SL Superset" microprocessor system, manufactured by Intel Corporation of Santa Clara, Calif., the assignee of the present invention. A transparent system interrupt is a system interrupt that is non-maskable by the operating system and the application programs. The non-maskable system interrupt has higher priority that all other maskable and non-maskable interrupts. Typically, all other interrupts are blocked while a transparent system interrupt is being serviced.

Referring now to FIG. 1, a flow diagram illustrating the operation flow of a transparent system interrupt is shown. Various mechanisms are typically provided to trigger the non-maskable transparent system interrupt. Once the non-maskable interrupt is detected, the microcode of the non-maskable interrupt typically puts the computer system into an execution mode that is transparent to the operating system. The execution mode is typically made transparent by swapping in a dedicated memory area which is normally not mapped in the computer system's memory address space, block 102. The dedicated memory area is swapped out of the computer system's memory address space when the computer system is subsequently restored to the pre-interrupted state, block 114.

As illustrated in FIG. 1, typically, a resume instruction is provided for taking the computer system out of the transparent execution mode, block 111. The resume instruction is executed by the prestored interrupt handler in the dedicated memory area after it has finished servicing the interrupt. The system state is saved into the dedicated memory area, block 104, before the interrupt handler is given control, block 110. The computer system is restored to the preinterrupted state based on the information saved, block 112.

The majority of the functions performed to service each incidence of the unmaskable system interrupt, block 110, typically can be performed in a relatively short time, thus creating a small and insignificant interrupt latency for the interrupted operating system and application programs. In most cases, the small interrupt latency is not a problem. However, as the application of transparent system interrupt broaden, there are many functions performed to service some of the incidences of the unmaskable system interrupt that may require relatively large amount of time to be performed. In some cases, the interrupted operating system and/or application programs are sensitive to the extended interrupt latency causing them to fail.

Thus, it is desirable if transparent system interrupts can be serviced with minimal interrupt latency, thereby further reducing the remote likelihood of causing the interrupted operating system and application programs to fail. As will be disclosed, these objects and desired results are among the objects and results achieved by the method and apparatus of the present invention for servicing transparent system interrupts and reducing interrupt latency.

For further description of transparent system interrupts and their applications, see product literatures provided by the assignee of the present invention, and the related applications referenced above.

SUMMARY OF THE INVENTION

A method and apparatus for servicing transparent system interrupts and reducing interrupt latency is disclosed. The method and apparatus has particular application to computer systems supporting transparent system interrupts, in particular, on computer systems where the transparent system interrupts are used in applications that require relatively lengthy interrupt latency and the interrupted programs are sensitive to such extended interrupt latency.

Under the present invention, a system management interrupt (SMI) handler comprising a plurality of service tasks is provided to service the SMIs. Additionally, a SMI task queue is provided to queue incidences of the service tasks, a SMI trigger mechanism comprising a timer is reserved for triggering execution of the service tasks, and a register is predesignated to store a status word for indicating the current SMI is being triggered by the reserved SMI trigger mechanism.

When given control, the main task of the SMI handler examines the status word in the predesignated register and determines if the SMI is triggered by the reserved SMI trigger mechanism. If not, the main task queues incidences of the necessary service tasks for servicing the current SMI. Upon queueing the necessary service tasks, the main task further determines if the reserved SMI trigger mechanism's timer is set. If not, the main task sets the reserved SMI trigger mechanism's timer. from the front of the SMI service task queue, and transfers execution control to the dequeued incidence of a service task. When the dequeued incidence of a service task completes its execution, it returns execution control to the main task. The main task then determines if the service queue is empty. If the service queue is not empty, it sets the reserved SMI trigger mechanism's timer.

In all cases, regardless whether the main task sets the reserved SMI trigger mechanism's timer, the main task causes the computer system to exit the transparent mode of execution and returns the CPU to the preinterrupted state by executing the Resume instruction.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for servicing transparent system interrupts and reducing interrupt latency is disclosed. The method and apparatus has particular application to computer systems supporting transparent system interrupts, in particular, on computer systems where the transparent system interrupts are used in applications that require relatively lengthy interrupt latency and the interrupted programs are sensitive to such extended interrupt latency.

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

System Overview

Figure 2:
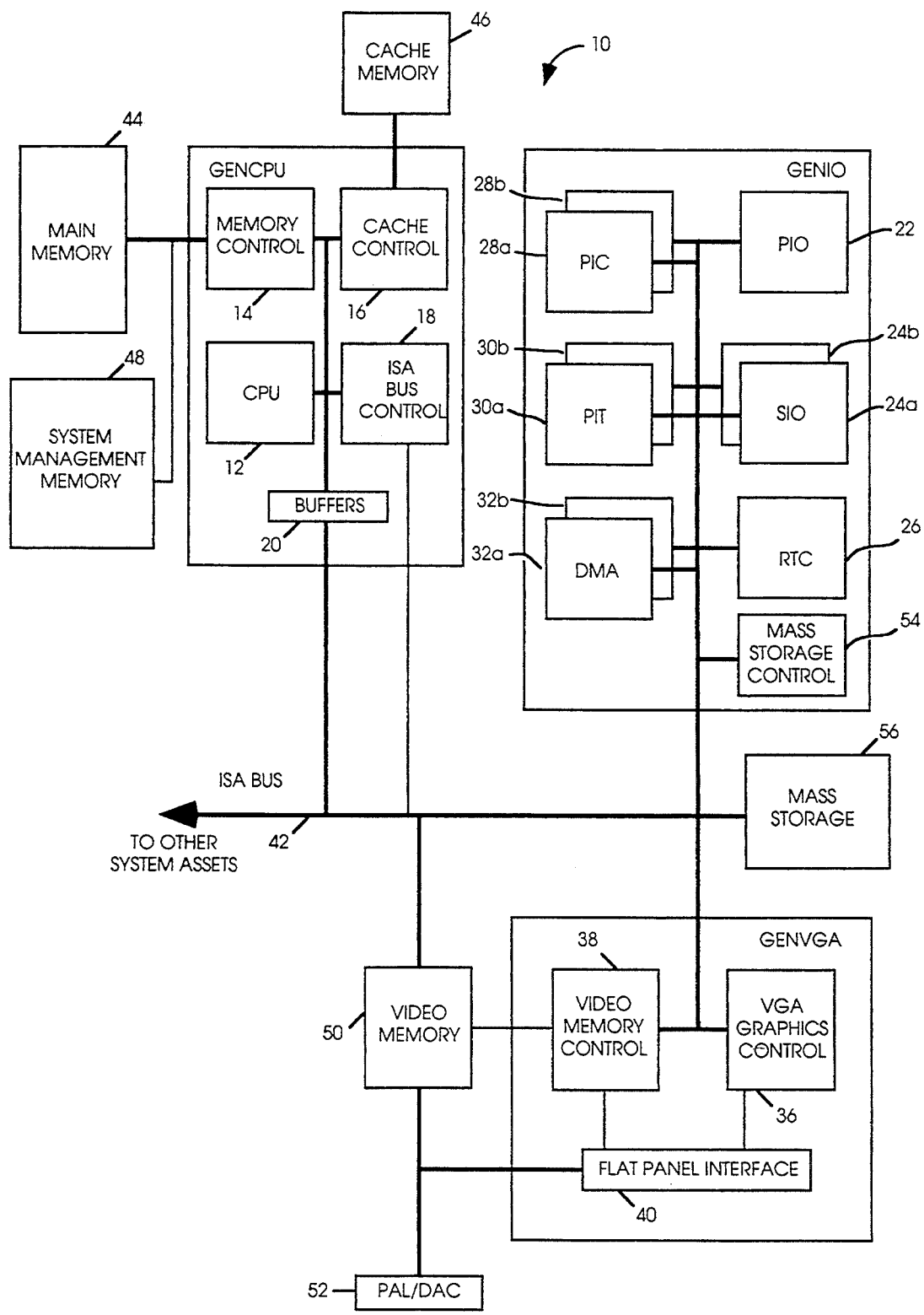
FIG. 2 is a functional block diagram of an exemplary microprocessor based computer system embodying the present invention.

Referring now to FIG. 2, a block diagram illustrating an exemplary microprocessor based computer system embodying the present invention is shown. The exemplary microprocessor based computer system 10 is briefly described below. The exemplary microprocessor based computer system 10 is essentially the "Intel386 TM SL Microprocessor Superset" manufactured by Intel Corporation, the corporate assignee of this invention. However, it is to be understood that the present invention is not limited to this particular microprocessor design, and may be incorporated in virtually any computer system design regardless whether it is microprocessor based.

Throughout this description, certain terminology relating to the "Intel386 TM SL Microprocessor Superset", such as register names, signal nomenclature, is employed to describe the present invention. Such terminology is understood by practitioners in the field of computer system design and will therefore not be explained at length herein.

The exemplary microprocessor based computer system 10 comprises three main components, designated as GENCPU, GENIO and GENVGA. GENCPU is an expanded central processing unit; GENIO is a single chip input/output unit; and GENVGA is a single chip graphics interface. The three components communicate with each other and with other system components (such as expansion slots, keyboard controller, disk controllers) via ISA bus 42.

GENCPU includes a CPU 12, a memory controller 14, a cache controller 16, ISA bus control logic 18 and line buffers 20. CPU 12 comprises a plurality of general registers (not shown), an instruction pointer register (not shown) containing an instruction pointer, and a prior instruction pointer register (not shown) containing a prior instruction pointer.

CPU 12 also comprises logics (not shown) for executing a plurality of instructions. The instructions operate on either zero, one, or two operands. An operand either resides in the instruction, in a register or in a memory location. CPU 12 has two modes of operations, a real mode and a protected mode. The primary differences between the real mode and the protected mode is how a logical address is translated into a linear address, the size of the address space, and paging capability.

Additionally, CPU 12 comprises logics (not shown) for executing a plurality of hardware and software interrupts. Hardware and software interrupts occur as the result of external events and system traps. The interrupts are classified into two types: maskable and nonmaskable. Interrupts are serviced after execution of the current instruction. After the interrupt service routine is finished with servicing the interrupt, execution proceeds with the instruction immediately after the interrupted instruction. Maskable interrupts are typically used to respond to asynchronous external hardware events. Unmaskable interrupts are typically used to service very high priority events.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, dual direct memory access controllers (DMA) 32a, 32b and mass storage controller 54. GENVGA includes VGA graphics controller 36, video memory controller 38 and interface 40 for a flat panel display unit.

Additionally, external to the three main components are system memory 44, cache memory 46, system management memory 48, video memory 50, an interface (PAL/DAC) 52 for a conventional VGA monitor, and mass storage 56. The external system memory 44 and system management memory 48 are accessed by the memory controller 14. The cache memory 46 and the video memory 50 are accessed by the cache memory controller 16 and video memory controller 38 respectively. The video memory 50 may also be accessed through the ISA bus 42, and the two interfaces 40, 52. The mass storage 56 is accessed through the ISA bus 42.

While the system memory 44 and the system management memory 48 are shown to be separate and external to the basic components GENCPU, GENIO and GENVGA of the exemplary microprocessor based computer system 10, it will be appreciated that the system memory 44 as well as the system management memory 48 may be integrated and/or internal to the one of the basic component, for example GENCPU.

For further description of the "Intel386 TM SL" Microprocessor Superset, see *Intel386 TM SL Microprocessor Superset Programmer's Reference Manual*, published by Intel Corporation as publication number 240815, and related publications.

System Management

Figure 1:
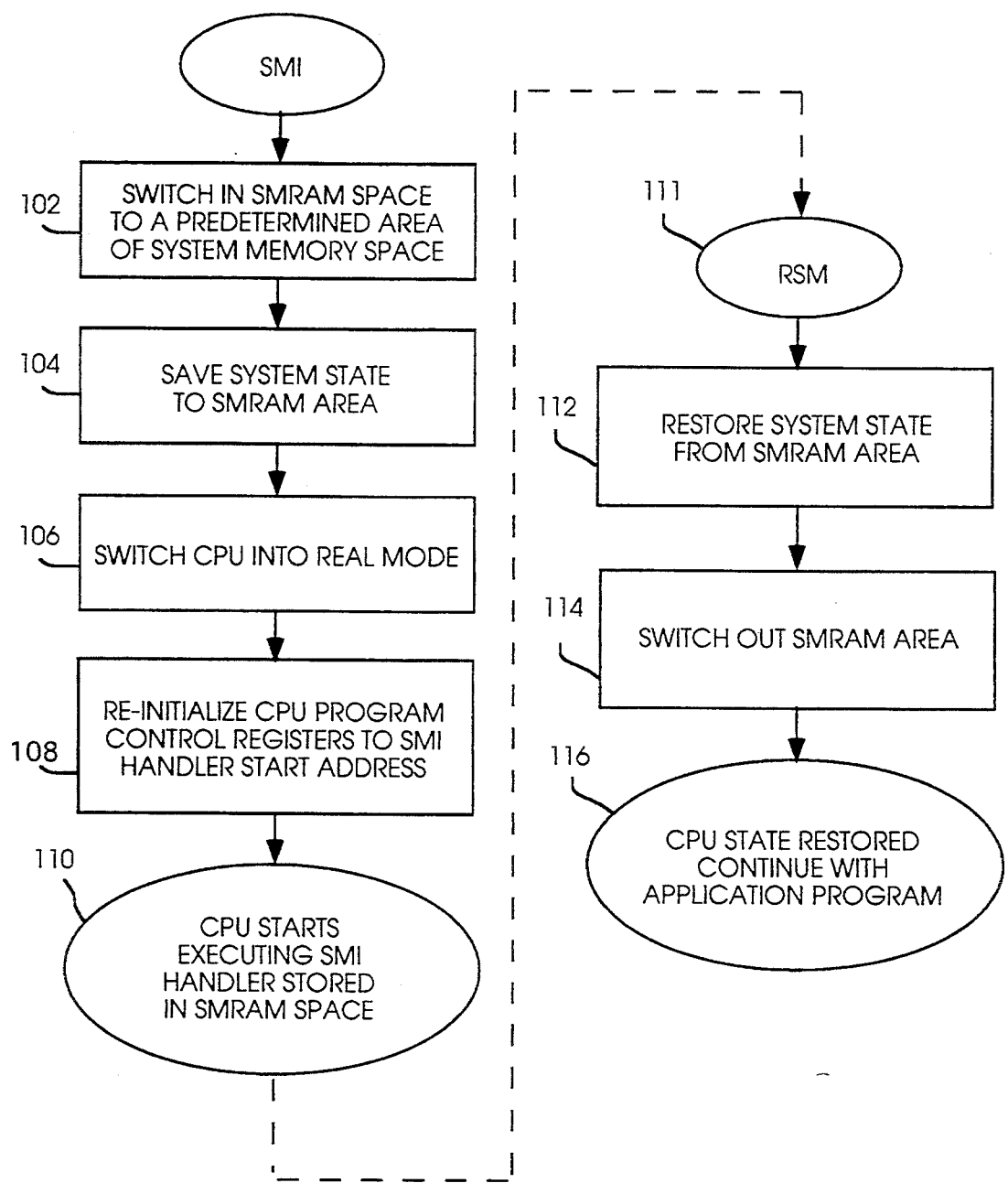
FIG. 1 is a flow diagram illustrating the operation flow of an exemplary transparent system interrupt.
Figure 3:
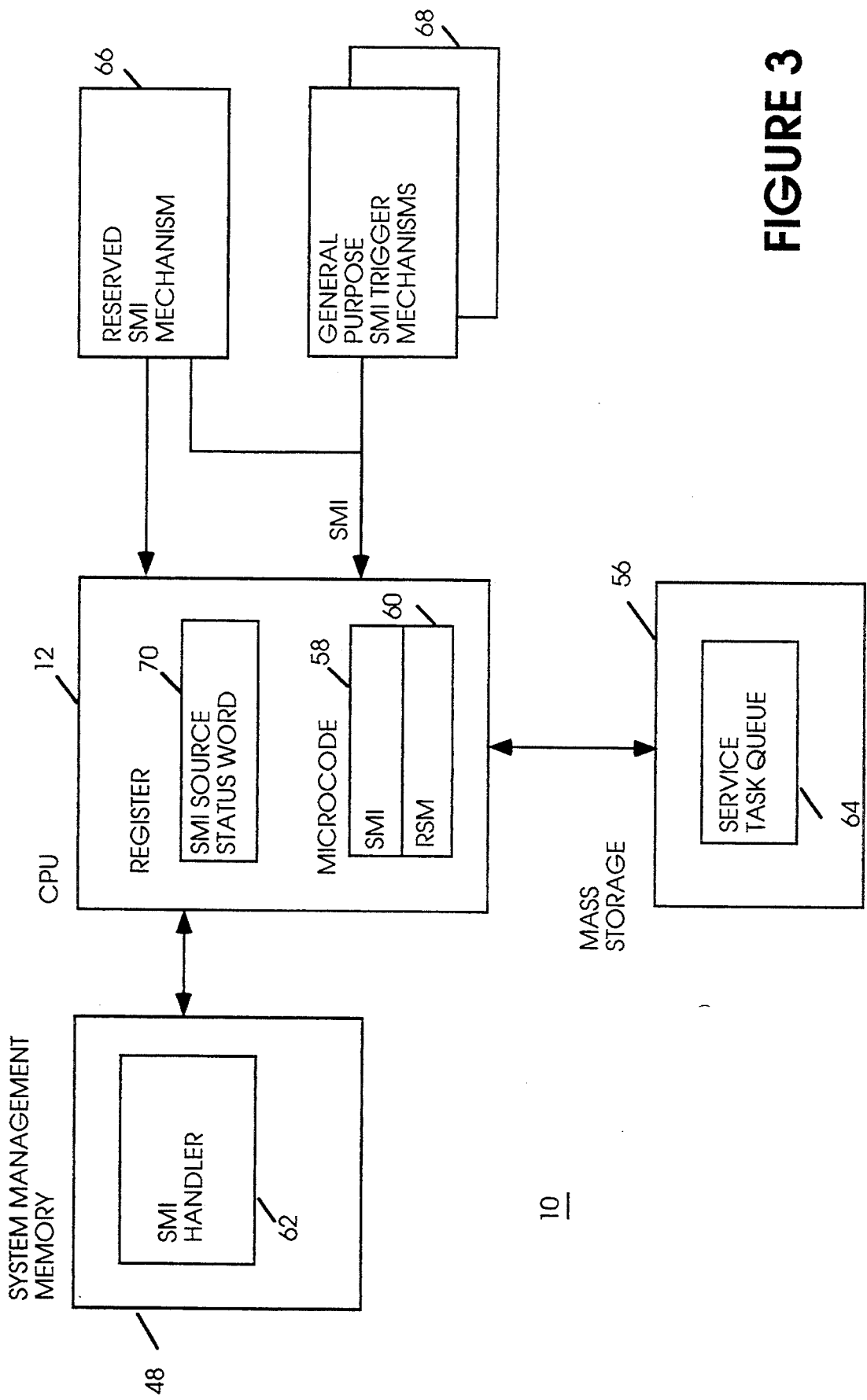
FIG. 3 is a block diagram illustrating the system management architecture of the exemplary microprocessor based computer system of FIG. 2.

Referring now to FIG. 3, a block diagram illustrating the system management architecture of the exemplary microprocessor based computer system of FIG. 2 is shown. Shown is CPU 12 comprising logic 58 for executing a System Management Interrupt (SMI). The microcode of SMI puts the computer system into a System Management Mode (SMM) of execution which is transparent to the interrupted operating system and programs. SMI puts the system in SMM in essentially the same manner as illustrated in FIG. 1. CPU 12 further comprises logic 60 for executing a Resume instruction (RSM) which takes the computer system out of SMM. RSM also takes the system out of SMM in essentially the same manner as illustrated in FIG. 1.

Additionally, stored in system management memory 48 is an interrupt handler 62 for servicing SMIs embodying the teachings of the present invention. Stored in mass storage 56 is a service task queue of the present invention 64 for queueing SMI service tasks. While the service task queue is being described as being stored in the mass storage 56, it will be appreciated that alternatively, the service task queue may be stored in main memory instead.

Furthermore, the exemplary microprocessor based computer system 10 comprises a number of trigger mechanism for triggering SMIs 66 and 68. At least one of these SMI trigger mechanism comprises a timer 66, and is reserved for triggering an SMI to cause one of the queued service tasks to be executed. One of the registers 70 of CPU 12 is designated for storing a SMI source status word to identify the reserved SMI triggering mechanism as the triggering source of a SMI. The SMI source status word is stored into the designated register 70 by the reserved SMI trigger mechanism when it triggers a SMI. Particular examples of mechanism for triggering a SMI event are external SMI pin, local and global timers.

The interrupt handler, the service tasks, the service task queue, the reserved SMI triggering mechanism, the SMI source status word, and the manner these elements cooperate under the present invention to service SMIs will be described in further detail below with references to FIGS. 4-6.

For further description of system management, also see *Intel386 TM SL Microprocessor Superset Programmer's Reference Manual*, published by Intel Corporation as publication number 240815, and related publications.

Interrupt Handler and Service Task Queue

Figure 4:
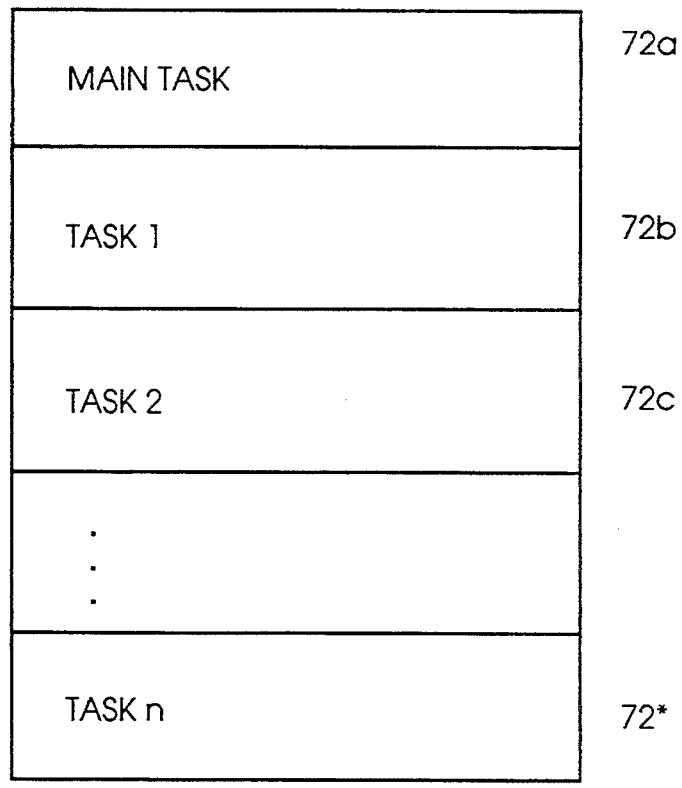
FIG. 4 is a block diagram illustrating the system management interrupt handler of the present invention.

Referring now to FIG. 4, a block diagram illustrating the SMI handler of the present invention is shown. Shown is a SMI handler 62 comprising a main service task 72a, and a number of other service tasks 72b-72*.

Each service task 72a, . . . , or 72* is designed to execute with a short interrupt latency. It will be appreciated that the number of service tasks required to achieve a desired upper bound for interrupt latency and the functionality of each service task 72a, . . . , or 72* are application dependent.

Figure 5:
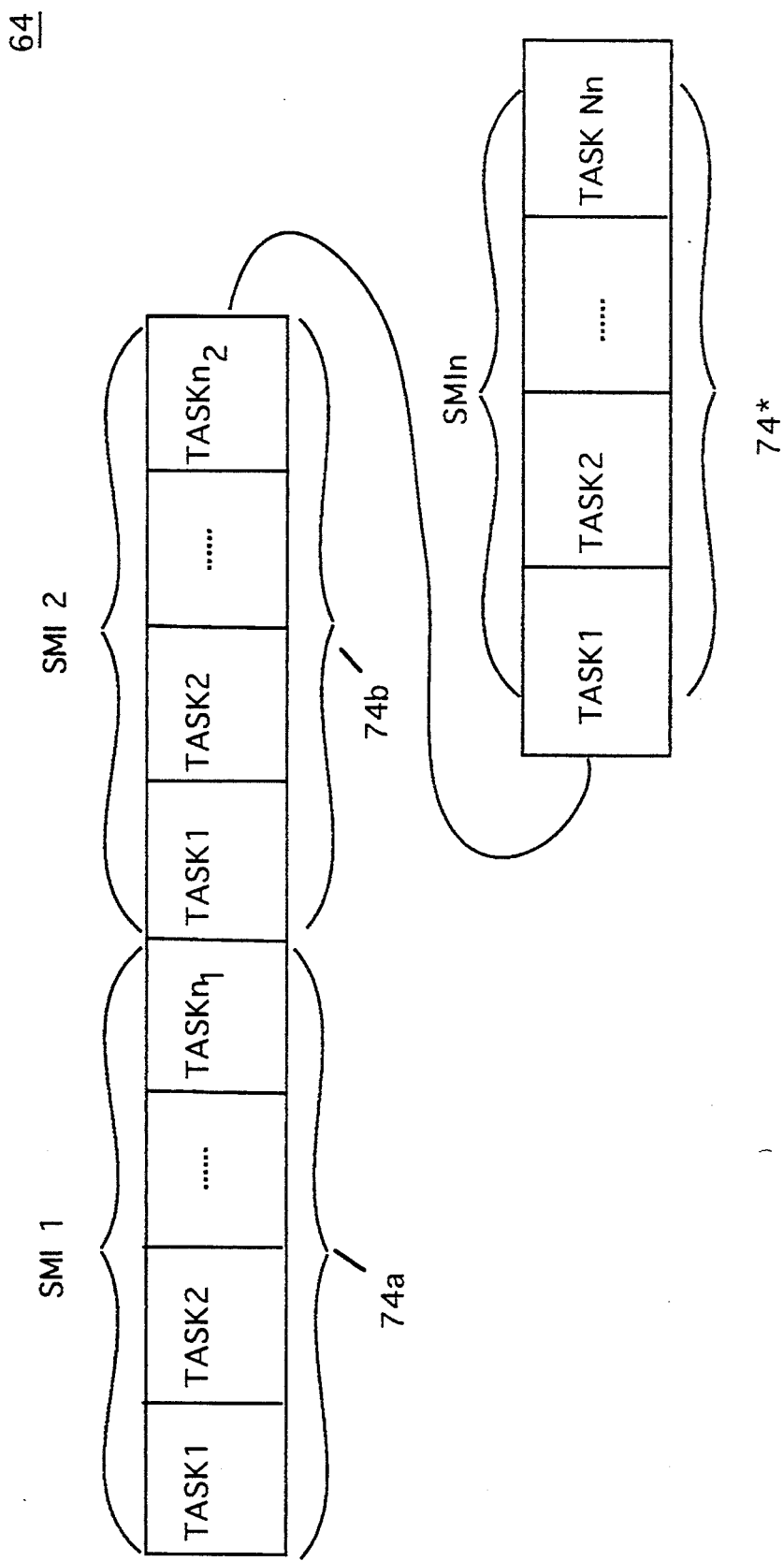
FIG. 5 is a block diagram illustrating one embodiment of the system management interrupt service task queue of the present invention.

Referring now to FIG. 5, a block diagram illustrating one embodiment of the service task queue of the present invention is shown. Shown is a service task queue 64 comprising a number of incidences of service tasks 74a-74* queued for servicing a number of SMIs. New incidences of service tasks 74* are queued to the end of the service task queue 64. Queued incidences of service tasks 74a-74* are dequeued for execution on a FIFO basis. It will be appreciated that the incidences of service tasks 74a-74* queued for servicing each SMI need not be the same. Furthermore, it will be appreciated that different queuing and dequeueing manner, or multiple queues or other equivalent data structures may be used instead.

Figure 6:
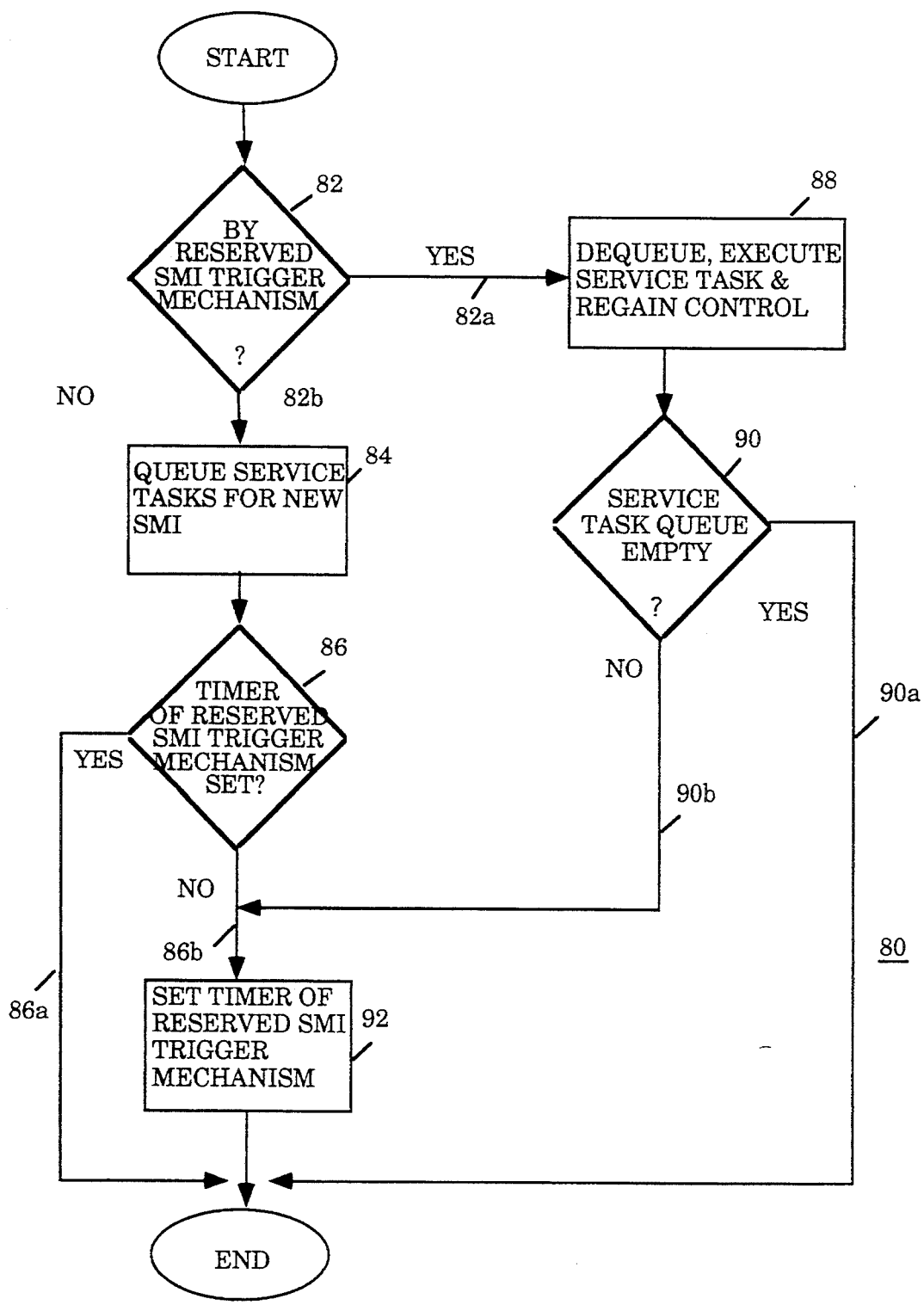
FIG. 6 is a flow diagram illustrating the method of the present invention for servicing transparent system interrupts and reducing interrupt latency.

Referring now to FIG. 6, a flow diagram illustrating the method of the present invention for servicing transparent system interrupts and reducing interrupt latency is shown. As illustrated, when the main task is given control after the system is put into SMM, the main task accesses the SMI source status word in the designated register to determine if the SMI is triggered by the reserved SMI trigger mechanism, block 82. If the SMI is not triggered by the reserved SMI trigger mechanism, branch 82b, the main task queues the necessary service tasks into the service task queue, block 84.

Upon queueing the necessary service tasks, the main task further checks to determine if the timer of the reserved SMI trigger mechanism is already set, block 86. The main task may make the determination directly by accessing the timer of the reserved SMI trigger mechanism or indirectly based on whether the service task queue was empty prior to the service tasks that are just queued. If the timer of the reserved SMI trigger mechanism is already set, branch 86a, the main task causes the computer system to go out of SMM in the normal manner, else, branch 86b, it sets the timer of the reserved SMI trigger mechanism, block 92, before causing the computer system to go out of SMM.

On the other hand, if the SMI is triggered by the reserved SMI trigger mechanism, branch 82a, the main task dequeues a service task from the service task queue, and transfers execution control to the dequeued service task, block 88. Upon completion of execution, the executed service task returns execution control to the main task, block 88. Upon getting control again, the main task determines if the service task queue is empty, block 90. If the service task queue is empty, branch 90a, the main task causes the computer system to go out of SMM in the normal manner, else, branch 90b, it sets the timer of the reserved SMI trigger mechanism, block 92, before causing the computer system to go out of SMM.

It will be appreciated, under the method of the present invention, the interrupt latency is reduced and may be optimized for different applications by different partitioning of the handler, and different allocation of service functions to the service tasks. Furthermore, the execution time allocated to the operating system and programs between execution of two service tasks may be optimized by varying the setting of the timer of the reserved SMI trigger mechanism.

Other Variations

While the method of the present invention has been described in terms of its presently preferred and alternate embodiments, those skilled in the art will recognize that the method of the present invention is not limited to the embodiments described. The method of the present invention may be practiced with modification and alteration within the spirit and scope of the appended claims. The specifications and drawings are, accordingly, to be regarded in an illustrative rather than a restrictive sense.

What is claimed is:

1. In a computer system comprising a central processing unit (CPU) for executing a plurality of programs and at least one storage unit coupled to said CPU for storing said programs and their data, said CPU further having a transparent system interrupt (TSI) for transparently interrupting execution of said programs, a plurality of general purpose TSI trigger mechanisms for triggering a plurality of general incidences of said TSI, and a TSI service handler for serving said triggered incidences of said TSI, a method for servicing said general incidences of said TSI with said TSI service handler and reducing their latency, said method comprising the steps of:

a) decomposing said TSI service handler into a main task and a plurality of service tasks, and organizing said service tasks into predetermined combinations for servicing said general incidences of said TSI based on their triggering mechanisms; and b) servicing each general incidence of said TSI incrementally by discretely executing the predetermined combination of service tasks corresponding to the triggering mechanism of the general incidence of said TSI, said discrete manner of executing said service tasks being effectuated using said main task and a plurality of successive special incidences of said TSI triggered by a reserved TSI trigger mechanism of said computer system, each of said successive special incidences of said TSI being triggered after an expiration of a delay period subsequent to a setting of said reserved TSI trigger mechanism, said interrupted programs being given back execution control in between said discrete executions of said service tasks.

2. The method as set forth in claim 1, wherein, said step b) comprises the steps of:

b.1) transferring execution control from said interrupted programs to said main task upon detection of each incidence of said TSI;

b.2) determining the trigger mechanism of each incidence of said TSI by said main task;

b.3) whenever an incidence of said TSI is determined by said main task to be triggered by an unreserved TSI trigger mechanism, queueing the service tasks of the predetermined combination for servicing the general incidence of said TSI in a service task queue by said main task, setting said reserved TSI trigger mechanism to trigger a special incidence of said TSI after a predetermined delay by said main task if said reserved TSI trigger mechanism is not set to trigger a special incidence of said TSI after a predetermined delay, and returning execution control from said main task to said interrupted programs by said main task; and b.4) whenever an incidence of said TSI is determined by said main task to be triggered by said reserved TSI trigger mechanism, dequeueing a queued service task from said service task queue by said main task, temporarily transferring execution control from said main task to the dequeued service task, regaining execution control from said dequeued service task by said main task upon execution of said dequeued service task, setting said reserved TSI trigger mechanism to trigger a special incidence of said TSI after a predetermined delay by said main task if said service task queue is not empty, and returning execution control from said main task to said interrupted programs by said main task.

3. The method as set forth in claim 2, wherein, said step b.2) comprises, for each incidence of said TSI, accessing a pre-designated register of said CPU by said main task, and examining a TSI source status word stored in said pre-designated register by said main task for the triggering mechanism of the incidence of said TSI, said TSI source status word being updated by each one of said TSI trigger mechanisms whenever it triggers an incidence of said TSI.

4. The method as set forth in claim 2, wherein, said service tasks queued in said step b.3) are queued to a back end of said service task queue.

5. The method as set forth in claim 2, wherein, each of said service tasks dequeued in said step b.4) are dequeued from a front end of said service task queue.

6. The method as set forth in claim 2, wherein,
   said reserved TSI trigger mechanism comprises a timer;
   said conditional setting of said reserved TSI trigger mechanism in said step b.3) comprises the steps of determining if said timer of said reserved TSI trigger mechanism is set, and setting said timer of said reserved TSI trigger mechanism if said timer of said reserved TSI trigger mechanism is not set;
   said conditional setting of said reserved TSI trigger mechanism in said step b.4) comprises the steps of determining if said service task queue is empty, and setting said timer of said reserved TSI trigger mechanism if said service task queue is not empty.

7. In a computer system comprising a central processing unit (CPU) for executing a plurality of programs and at least one storage unit coupled to said CPU for storing said programs and their data, said CPU further having a transparent system interrupt (TSI) for transparently interrupting execution of said programs, a plurality of general purpose TSI trigger mechanisms for triggering a plurality of general incidences of said TSI, and a TSI service handler for serving said triggered incidences of said TSI, an apparatus for servicing said general incidences of said TSI with said TSI service handler and reducing their latency, said apparatus comprising:

a) a main task, and a plurality of service tasks organized into predetermined combinations, for servicing said general incidences of said TSI based on their triggering mechanisms, said main and service tasks being decomposed portions of said TSI service handler;

b) a reserved TSI trigger mechanism for successively triggering a plurality of special incidences of said TSI, each of said successive incidences of said TSI being triggered after an expiration of a delay period subsequent to a setting of said reserved TSI trigger mechanism;

c) means coupled to said main and service tasks and said reserved TSI trigger mechanism for servicing each general incidence of said TSI incrementally by discretely executing the predetermined combination of service tasks corresponding to the triggering mechanism of the general incidence of said TSI, said discrete manner of executing said service tasks being effectuated using said main task and said successive special incidences of said TSI, said interrupted programs being given back execution control in between said discrete executions of said service tasks.

8. The apparatus as set forth in claim 7 wherein, said means for servicing each general incidence of said TSI incrementally comprises a service task queue for queueing said service tasks;

said main task is given execution control from said interrupted programs upon detection of each incidence of said TSI;

said main task determines the trigger mechanism of each incidence of said TSI;

whenever an incidence of said TSI is determined by said main task to be triggered by an unreserved TSI trigger mechanism, said main task queues the service tasks of the predetermined combination for servicing the general incidence of said TSI in said service task queue, sets said reserved TSI trigger mechanism to trigger a special incidence of said TSI after a predetermined delay if said reserved TSI trigger mechanism is not set to trigger a special incidence of said TSI after a predetermined delay, and returns execution control from itself to said interrupted programs; and whenever an incidence of said TSI is determined by said main task to be triggered by said reserved TSI trigger mechanism, said main task dequeues a queued service task from said service task queue by said main task, temporarily transfers execution control from itself to the dequeued service task, regains execution control from said dequeued service task upon execution of said dequeued service task, sets said reserved TSI trigger mechanism to trigger a special incidence of said TSI after a predetermined delay by said main task if said service task queue is not empty, and returns execution control from itself to said interrupted programs.

9. The apparatus as set forth in claim 8, wherein, said CPU further comprises a pre-designated register for storing a TSI status word identifying the triggering mechanism of an incidence of said TSI;

said TSI status word being updated by each one of said TSI trigger mechanisms whenever it triggers an incidence of said TSI;

said main task, for each incidence of said TSI, accesses said pre-designated register, and examines said stored TSI source status word to determine the triggering mechanism of the incidence of said TSI.

10. The apparatus as set forth in claim 8, wherein, said main task queues said service tasks to a back end of said service task queue.

11. The apparatus as set forth in claim 8, wherein, said main task dequeues each one of said service tasks from a front end of said service task queue.

12. The apparatus as set forth in claim 8, wherein, said reserved TSI trigger mechanism comprises a timer;

whenever an incidence of said TSI is determined by said main task to be triggered by an unreserved TSI trigger mechanism, said main task determines if said timer of said reserved TSI trigger mechanism is set, and setting said timer of said reserved TSI trigger mechanism if said timer of said reserved TSI trigger mechanism is not set;

whenever an incidence of said TSI is determined by said main task to be triggered by said reserved TSI trigger mechanism, said main task determines if said service task queue is empty, and sets said timer of said reserved TSI trigger mechanism if said service task queue is not empty.

13. In a computer system comprising a central processing unit (CPU) for executing a plurality of programs and at least one storage unit coupled to said CPU for storing said programs and their data, said CPU further having a transparent system interrupt (TSI) for transparently interrupting execution of said programs, a plurality of general purpose TSI trigger mechanisms for triggering a plurality of general incidences of said TSI, and a TSI service handler for serving said triggered incidences of said TSI, an apparatus for servicing said general incidences of said TSI with said TSI service handler and reducing their latency, said apparatus comprising:

a) a main task, and a plurality of service tasks organized into predetermined combinations, for servicing said general incidences of said TSI based on their triggering mechanisms, said main and service tasks being decomposed portions of said TSI service handler;

b) a reserved TSI trigger mechanism for successively triggering a plurality of special incidences of said TSI, each of said successive incidences of said TSI being triggered after an expiration of a delay period subsequent to a setting of said reserved TSI trigger mechanism;

c) a service task queue for queueing said service tasks;

each general incidence of said TSI being serviced incrementally by discretely executing the predetermined combination of service tasks corresponding to the triggering mechanism of the general incidence of said TSI, said discrete manner of executing said service tasks being effectuated using said main task, said service task queue, and said successive special incidences of said TSI, said interrupted programs being given back execution control in between said discrete executions of said service tasks.

14. The apparatus as set forth in claim 13, wherein, said main task is given execution control from said interrupted programs upon detection of each incidence of said TSI;

said main task determines the trigger mechanism of each incidence of said TSI;

whenever an incidence of said TSI is determined by said main task to be triggered by an unreserved TSI trigger mechanism, said main task queues the service tasks of the predetermined combination for servicing the general incidence of said TSI in said service task queue, sets said reserved TSI trigger mechanism to trigger a special incidence of said TSI after a predetermined delay if said reserved TSI trigger mechanism is not set to trigger a special incidence of said TSI after a predetermined delay, and returns execution control from itself to said interrupted programs; and whenever an incidence of said TSI is determined by said main task to be triggered by said reserved TSI trigger mechanism, said main task dequeues a queued service task from said service task queue by said main task, temporarily transfers execution control from itself to the dequeued service task, regains execution control from said dequeued service task upon execution of said dequeued service task, sets said reserved TSI trigger mechanism to trigger a special incidence of said TSI after a predetermined delay by said main task if said service task queue is not empty, and returns execution control from itself to said interrupted programs.

15. A computer system comprising:
a) a central processing unit (CPU) for executing a plurality of programs;
b) at least one storage unit coupled to said CPU for storing said programs and their data;
c) a transparent system interrupt (TSI) for transparently interrupting execution of said programs;
d) a plurality of general purpose TSI trigger mechanisms for triggering a plurality of general incidences of said TSI;
e) a main task, and a plurality of service tasks organized into predetermined combinations, for servicing said general incidences of said TSI based on their triggering mechanisms;
f) a reserved TSI trigger mechanism for successively triggering a plurality of special incidences of said TSI, each of said successive incidences of said TSI being triggered after an expiration of a delay period subsequent to a setting of said reserved TSI trigger mechanism; and
g) a service task queue for queueing said service tasks;

each general incidence of said TSI being serviced incrementally by discretely executing the predetermined combination of service tasks corresponding to the triggering mechanism of the general incidence of said TSI, said discrete manner of executing said service tasks being effectuated using said main task, said service task queue, and said successive special incidences of said TSI, said interrupted programs being given back execution control in between said discrete executions of said service tasks.

* * * * *